US006932628B1

(12) United States Patent
Staedt

(10) Patent No.: US 6,932,628 B1
(45) Date of Patent: Aug. 23, 2005

(54) ELECTRICAL BOX WITH PIVOTING TABS

(76) Inventor: Brad L. Staedt, 520 W. Breen Ave., Kingsford, MI (US) 49802

( * ) Notice: Subject to any disclaimer, the term of this patent is extended or adjusted under 35 U.S.C. 154(b) by 0 days.

(21) Appl. No.: 10/830,931

(22) Filed: Apr. 26, 2004

(51) Int. Cl.[7] .............................................. H01R 13/44
(52) U.S. Cl. ........................... 439/138; 174/50; 174/61
(58) Field of Search .......................... 439/138; 174/50, 174/50.4, 54, 61, 51

(56) References Cited

U.S. PATENT DOCUMENTS

| 4,823,534 | A | 4/1989 | Hebinck |
| 5,377,470 | A | 1/1995 | Hebinck |
| 6,309,239 | B1 * | 10/2001 | Johnston ..................... 439/373 |
| 6,635,822 | B2 * | 10/2003 | Krupa, Jr. ..................... 174/58 |
| 6,737,576 | B1 * | 5/2004 | Dinh ............................ 174/50 |
| 6,774,304 | B1 * | 8/2004 | Gretz ........................... 174/50 |

* cited by examiner

Primary Examiner—Truc Nguyen
(74) Attorney, Agent, or Firm—Ryan Kromholz & Manion, S.C.

(57) ABSTRACT

An electrical box is removeably anchored in an insulated foam building wall panel. The electrical box comprises a receptacle that is inserted into a recess cut in the foam panel. Assembled to the receptacle back wall are one or more tabs. The tabs are pivotable from a storage position inside the receptacle to a working position whereat they project through slots in the receptacle and embed in the foam panel. The tabs are assembled to the receptacle by pivoting members, each comprising a screw that is turnable from outside the receptacle. The pivoting member may produce a friction torque on the tab by gripping the tab between the screw head and a nut. Alternately, the tab may have a non-circular hole that matches and receives a section of the screw to produce a positive torque on the tab. A drag is also produced on each tab to prevent unintentional pivoting.

33 Claims, 3 Drawing Sheets

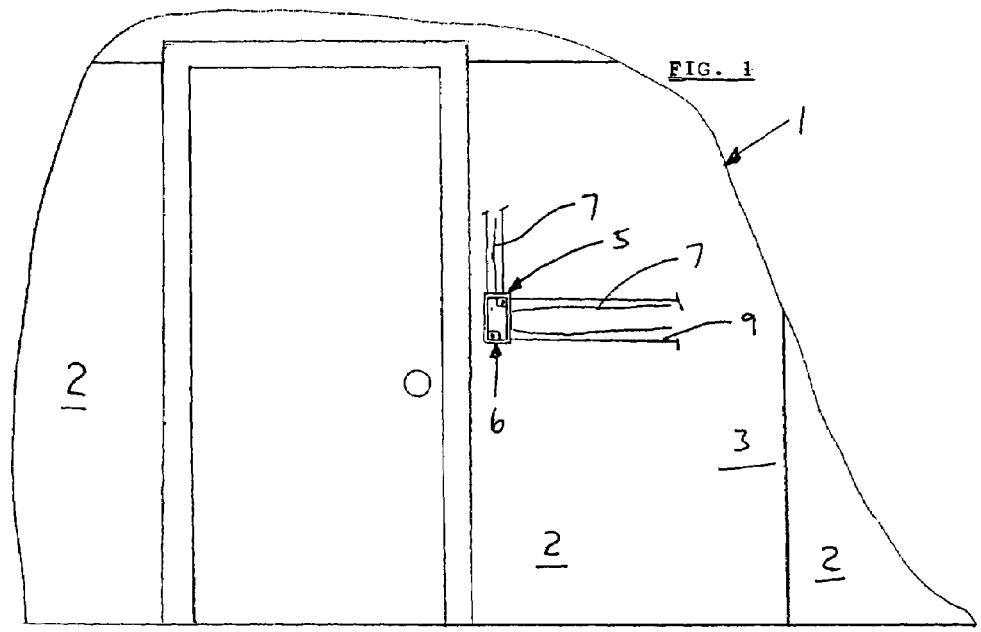
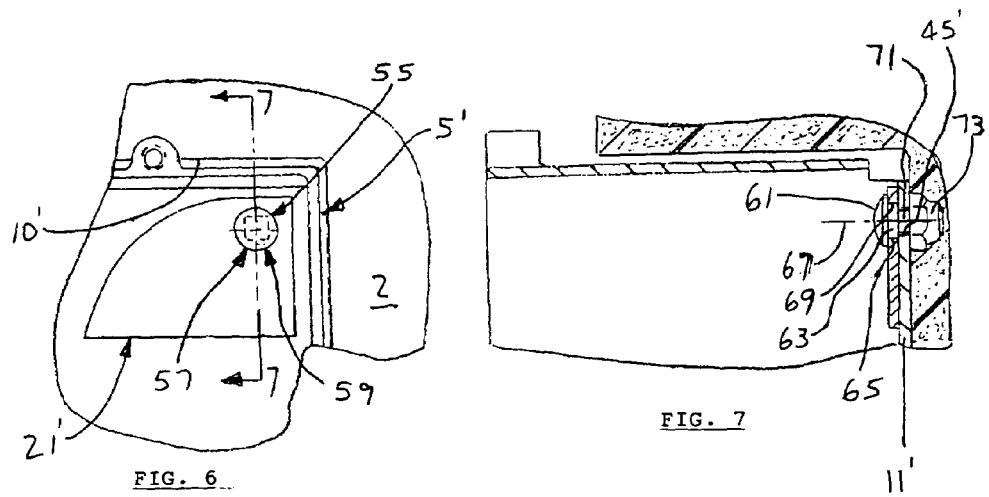

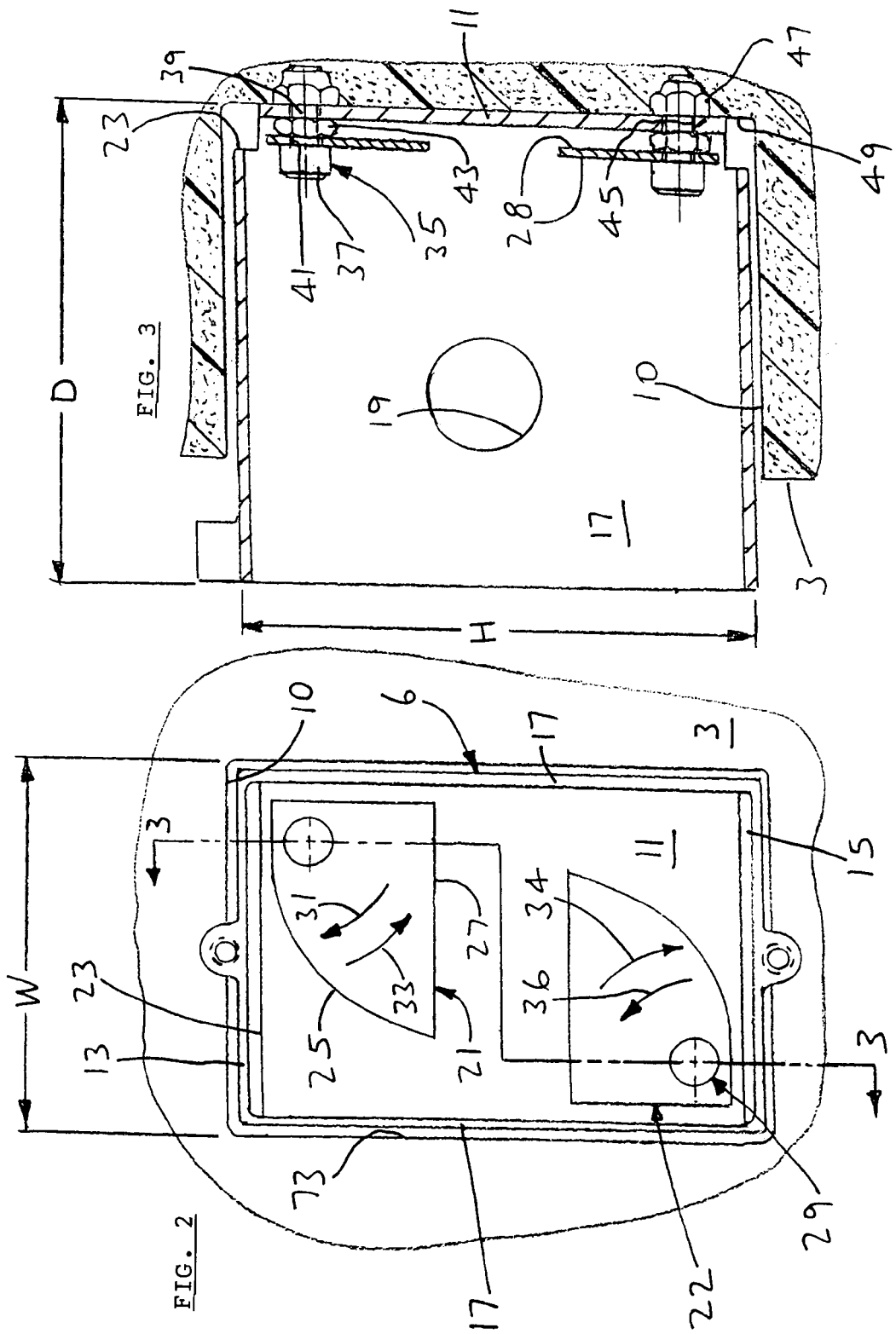

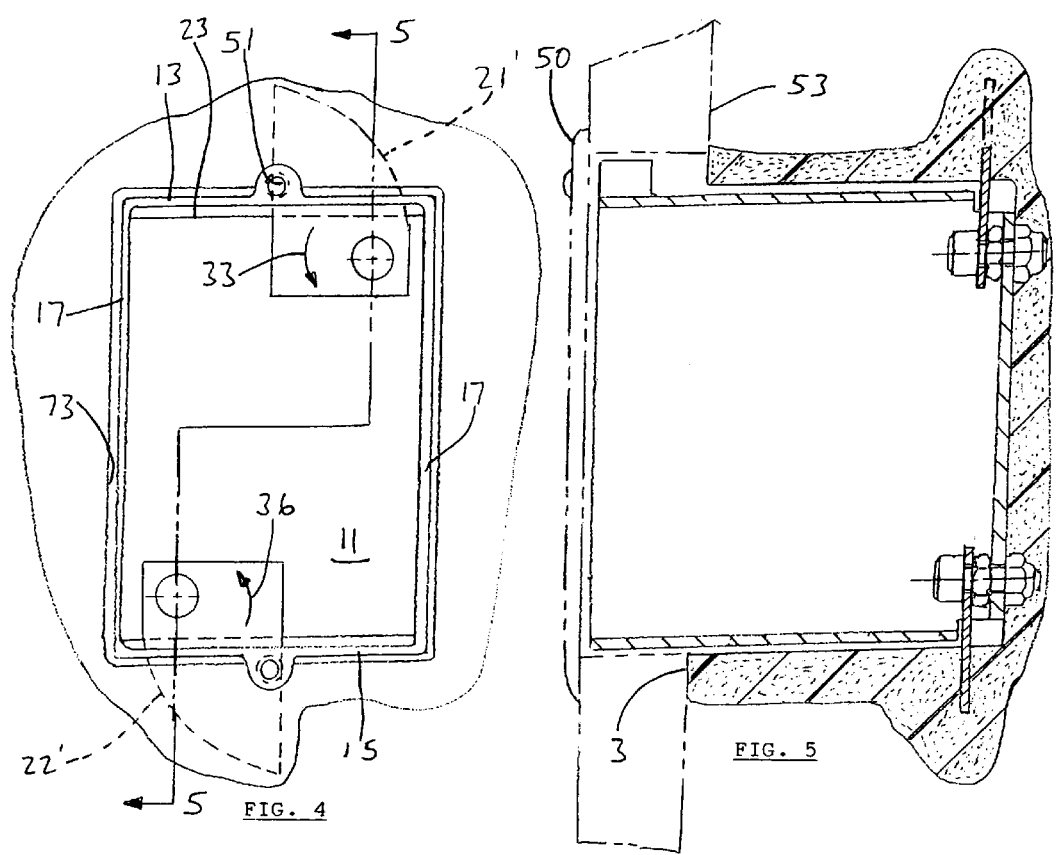

ELECTRICAL BOX WITH PIVOTING TABS

BACKGROUND OF THE INVENTION

1. Field of the Invention

This invention pertains to building construction, and more particularly to apparatus used to install electrical wiring in buildings.

2. Description of the Prior Art

Electrical systems are a major part of modern buildings. Even relatively modest buildings have long lengths of electrical wire and numerous outlets for interfacing with switches, plugs, and other devices.

Important components of a building electrical system are electrical boxes. Electrical boxes are available in a wide variety of sizes, shapes, and styles. They serve several purposes such as holding switches, light fixtures, and other devices in place. They protect the junctions of wires with other wires and with various electrical devices. At the same time, they provide access to the wire junctions.

In a building with frame construction, electrical boxes are usually nailed to a stud or rafter to hold the box in place. After the box has been wired, rolls or batts of insulation are usually installed between the studs and rafters. Then the studs and/or rafters and insulation are covered with decorative panels, gypsum board, or other materials. The fronts of the boxes are closed with plates of different kinds to suit the components in the boxes as well as the decorative scheme of the finished walls.

With the ever rising costs of energy, conventional frame building construction is being re-evaluated. To obtain increased insulative value, wider studs are used in external walls to accommodate thicker insulation rolls and batts. However, there is a practical limit for stud width due to the additional expense associated with the studs and their installation.

As an alternative to frame construction with roll or batt insulation for building walls, walls made of expanded polystyrene foam are becoming increasing popular. That foam material has greater thermal resistance than traditional spun fiberglass insulation. The foam is normally supplied as large but light weight panels with interconnecting cutouts. After the foam panels have been erected, concrete is poured into the cutouts to provide structural rigidity to the wall.

Despite their superior insulation characteristics, the use of foam panels in buildings creates a problem in relation to the building electrical wiring. Specifically, the electrical boxes cannot be nailed to non-existent studs. Merely forming a recess in a foam panel for a box is not satisfactory, because the box is not anchored and is prone to falling out of a foam panel.

As one solution to the problem of installing electrical boxes in foam walls, the Wind Lock company of Leesport, Pa., has designed boxes that are surrounded by the concrete poured into the foam panel cutouts. However, those boxes were undesirably expensive. Moreover, since they were embedded in the concrete wall, they could not be easily removed if changes to them were desirable at a later date.

Thus, a need exists for improvements in electrical boxes for foam building walls.

SUMMARY OF THE INVENTION

In accordance with the present invention, an electrical box is provided that is easily anchored in and removed from foam panel building walls. This is accomplished by tabs that are assembled to and pivot through slots in a receptacle and embed in the foam panel.

The receptacle may be of any conventional or other size and shape. Typically, the receptacle has top, bottom, side, and back walls. It may be made from a metal or plastic material. Knockouts as are well known are usually present in one or more walls.

At least one and preferably two or more tabs are pivotally connected to a receptacle wall. The tabs are made from a thin but rigid material. Sheet steel is a suitable material. Each tab has opposite ends that are connected by leading and trailing edges. A pivoting member assembles each tab, preferably near an end of the tab, to the receptacle wall. Turning the pivoting member produces a torque on the associated tab and causes it to pivot in a plane parallel to the wall between a storage position and a working position. When in the storage position, the tabs are entirely inside the receptacle close to the wall. When in the working position, the tabs project through associated slots in the receptacle walls.

According to one aspect of the invention, the pivoting members each comprise a screw and a nut that tightly grip an associated tab between them. Turing the screw produces a friction torque on the tab to pivot the tab. Alternately, the screw may have a non-circular section that is received in and matches a hole in the tab. In that case, turning the screw produces a positive torque on the tab. The pivoting members further comprise means for producing a drag on the tabs in response to turning the pivoting members.

The electrical box of the invention is used with buildings having foam panel walls. A recess is cut into the foam panel at the desired location for the box. The recess is sized to loosely receive the receptacle. If desired, the recess can be shallower than the depth of the receptacle. Channels for the wires are cut, as with a hot knife, in the foam panel leading to the recess.

The box tabs are pivoted by means of their respective pivoting members to their storage positions, and the box is pushed into the foam panel recess. The pivoting member of a tab is turned in a manner that causes the tab to pivot toward the associated slot in the receptacle. The tab pivots through the slot, and the tab leading edge contacts the foam panel. By continuing to turn the pivoting member, the tab leading edge cuts into the foam panel. The pivoting member and tab are pivoted until the tab is at the maximum projection from the receptacle. The process is repeated for all tabs in the box. The result is that the tabs become embedded in the foam panel, and the box cannot be pulled out of the recess. The box is wired in the usual manner. After the foam panel has been covered with decorative panels or the like, the box is closed. It remains anchored in place until a person intentionally turns the pivoting members and pivots the tabs back to their storage positions.

The method and apparatus of the invention, using tabs that are selectively projectable through receptacle slots, thus anchors the box in a foam panel wall. The probability that the box will become loose in the foam panel is remote, even though the receptacle itself fits only loosely in the panel recess.

Other advantages, benefits, and features of the present invention will become apparent to those skilled in the art upon reading the detailed description of the invention.

BRIEF DESCRIPTION OF THE DRAWINGS

FIG. 1 is a front view of a typical building wall made of foam panels and having electrical wiring and an outlet box.

FIG. 2 is an enlarged front view of the electrical box of the invention.

FIG. 3 is a cross-sectional view taken along line 3—3 of FIG. 2.

FIG. 4 is a view similar to FIG. 2, but showing the tabs of the electrical box in their working positions.

FIG. 5 is a cross-sectional view taken along line 5—5 of FIG. 4.

FIG. 6 is a front view of an alternative construction for the pivoting member of the invention.

FIG. 7 is a cross-sectional view taken along line 7—7 of FIG. 6.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, a portion of a building wall 1 is illustrated that includes the preset invention. The wall 1 is constructed from multiple insulated foam wall panels 2 such as are manufactured and marketed by Polarfoam Inc. of Pembine, Wis. The insulated wall panels 2 are composed of expanded polystyrene foam. Concrete reinforcement columns and cross arches are poured into channels in the foam panels to provide additional rigidity to the wall. The foam panels have a substantially coplanar front surface 3.

In accordance with the present invention, an electrical box 5 is provided that is easily anchored into and removed from the building wall 1. The box 5 includes an open receptacle 6. Looking also at FIGS. 2 and 3, the particular receptacle 6 illustrated is merely representative of a wide variety of receptacle styles that are encompassed by the present invention. Receptacle variables that fall within the scope of the present invention include size, shape, and material. In addition, the receptacle may have any pattern of knockouts to suit the particular wiring and electrical device to be served by the box.

The depicted receptacle 6 has a back wall 11, top wall 13, bottom wall 15, and side walls 17. The receptacle thus has a height H, width W, and depth D that are determined by the size of the five walls. Reference numeral 19 represents a typical knockout in a side wall 17.

At the intersection of the back wall 11 and at least one of the top, bottom, or side walls is a slot 23. The slot 23 may, but need not, extend for the full length of the intersection between the back wall and the adjacent intersecting wall. As illustrated, the receptacle 6 has one slot at the intersection of the back and top walls and another slot at the intersection of the back and bottom walls.

Assembled to the receptacle back wall 11 are one or more tabs; in the illustrated construction there are two tabs 21 and 22. Each tab 21 and 22 has a leading edge 25, a trailing edge 27, and opposed surfaces 28. The leading edges 25 are preferably convex, and the trailing edges are straight. However, both the leading edge and the trailing edge can have other shapes, if desired. In one corner of each tab is a pivoting member 29. The pivoting members 29 assemble the tabs to the receptacle back wall such that turning the pivoting members produces a torque on the tabs and causes them to pivot. Specifically, the tab 21 pivots in the directions of arrows 31 and 33, and the tab 22 pivots in the directions of arrows 34 and 36.

In the illustrated construction, the pivoting member 29 comprises a screw 35 having a hexagon socket head 37 and a shank 39. The screw shank 39 passes through a hole 41 in the tab and mates tightly with a jam nut 43 to tightly grip the tab between the screw head 37 and the jam nut. The screw shank also passes through a hole 45 in the receptacle back wall 11 and mates with a lock nut 47 that is outside of the receptacle back wall. The lock nut 47 is tightened to assemble the tab to the receptacle. To prevent the tabs from pivoting unintentionally, the lock nut 47 is tightened an amount that produces a drag on the tab when the pivoting member is turned.

In FIGS. 2 and 3, the tabs 21 and 22 are illustrated in storage positions. When in the storage positions, the tabs are fully inside the box 5 and are fully overlapped by the back wall 11. By turning the heads 37 of the screws 35 with a hex wrench in the direction of arrows 31 and 34, the tabs 21 and 22, respectively, pivot in the directions of arrows 31 and 34 through the slots 23 to the working positions shown at reference numerals 21' and 22' in FIGS. 4 and 5. Turning the screw heads in the directions of arrows 33 and 36 pivots the tabs back to their storage positions of FIGS. 2 and 3.

As mentioned, the slots 23 are shown at the intersection of the receptacle back wall 11 and top wall 13, and at the intersection of the back wall and the bottom wall 15. However, the slots may be at the intersections of the back wall and the side walls 17, if desired. Also, the slots need be only long enough to allow passage of the tabs 21 and 22 through them; they need not be the full width of the back wall as is illustrated.

To use the box 5, a recess 10 is cut in the foam panel front surface 3. The recess 10 has side surfaces 73 of a depth and width that are chosen to loosely receive the receptacle 6. The depth of the recess is typically less that the depth D of the receptacle. The screws 35 are turned in the directions of arrows 33 and 36, if necessary, to assure that the tabs 21 and 22, respectively, are in the storage positions. The desired knockouts 19 are removed from the receptacle. The box is inserted into the foam panel recess until the locknuts 47 contact the recess bottom surface 49. The box is pushed such that the lock nuts penetrate the foam surface 49 until the receptacle back wall 11 contacts the surface 49. Alternately, small depressions can be dug into the surface 49 with a hand tool to receive the lock nuts 47.

When the box 5 is in place, the pivoting members 29 are turned in the directions of arrows 31 and 34. That is achieved from outside the box by means of a hex wrench inserted into the sockets in the screw heads 37. The tabs 21 and 22 pivot in the same respective directions through the receptacle slots 23. The tabs leading edges 25 emerge from the slots and contact the foam panel 2. The pivoting members are continued to be turned, which causes the tabs leading edges to cut into the foam side surfaces 73 and embed in them. See FIGS. 4 and 5. The tabs are pivoted until they reach their final working positions. At that point, the box is firmly anchored to the foam panel.

The box 5 is wired in the normal way. Reference numerals 7 indicate typical wires leading to and from the box. The wiring 7 is placed in the channels 9 that are cut, as with a hot knife, in the foam panels 2. The wires are pulled through the receptacle holes opened by the removed knockouts 19. After the wiring is complete, finishing material such as a gypsum board or decorative panel 53 is placed over the foam panel front surface 3. A cover plate 50 is screwed to the box by means of tapped holes 51 in the receptacle 6. The box remains firmly in place in the foam panel indefinitely. Yet, it is easily removed if required at a later date.

It is an important feature of the invention that the pivoting members and tabs can coact in numerous ways such that turning the the pivoting members also pivots the tabs. In FIGS. 2–5, friction between the screw heads 37, tab opposed surfaces 28, and jam nuts 43 produces the torque on the tabs in response to turning the pivoting members 29. In place of a friction torque between the pivoting members and the tabs, a positive torque may be employed. Looking at FIGS. 6 and 7, a box 5' is inserted into a recess 10' in a foam panel 2. The box 5' has a tab 21' and a pivoting member 57. The pivoting member 57 acts with a positive torque on the tab 21' in response to turning the pivoting member 57.

To achieve that result, the pivoting member 57 comprises a screw 59 having a head 61 with a hex socket. The screw 59 further has a section 63 adjacent the head 61 that has a non-circular periphery 65 about the screw longitudinal axis 67. As illustrated, the section 63 has the shape of a square, with four surfaces on the periphery 65. However, other shapes such as hexagon, segment, or oval are also within the scope of the present invention. In each case, the tab has a hole 69 through it with a shape that matches the surfaces of the periphery 65. The screw 59 also has a threaded shank 71 that passes through the hole 45' in the receptacle back wall 11'. A lock nut 73 is tightened on the threaded shank 71 enough to produce a drag on the tab 21' when the screw head is turned. In that manner, turning the pivoting member produces a positive torque on the tab 21' and causes the tab to pivot in response to turning the screw.

In summary, the results and advantages of foam wall panels can now be more fully realized. The electrical box of the present invention provides both firm anchoring to foam panels as well as easy removal if required. This desirable result comes from using the combined functions of the tabs. In a storage position, the tabs are completely inside the receptacle to enable the box to be inserted into and removed from a recess in the foam panel. In a working position, the tabs are embedded in the foam panel and prevent the box from being removed from the recess. The box is wired in the usual manner. The tabs are assembled to the box with pivoting members that can produce either a friction torque or a positive torque on the tabs for pivoting them in response to turning the pivot member.

It will also be recognized that in addition to the superior performance of the electrical box of the invention, its construction is such as to cost little, if any, more than traditional electrical boxes. In fact, any additional cost is quickly recouped because of the increased efficiency and productivity it provides for electricians.

Thus, it is apparent that there has been provided, in accordance with the invention, an electrical box with pivoting tabs that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An electrical box comprising:
   a. a receptacle having a plurality of walls that define an interior and an exterior of the receptacle, at least one wall having a slot therethrough;
   b. at least one tab having opposed first and second surfaces, the tab including a leading edge adapted to cut and embed into a wall surface; and
   c. at least one pivoting member that assembles the at least one tab to a selected receptacle wall, the at least one tab pivoting between a storage position whereat the leading edge is substantially within the interior of the receptacle and a working position whereat the leading edge projects through the at least one slot and is substantially outside the receptacle walls in response to turning the at least one pivoting member.

2. The electrical box of claim 1 wherein:
   a. the receptacle has back, side, top, and bottom walls;
   b. the at least one receptacle slot is at the intersection of the back wall and a selected one of the top, bottom, or side walls; and
   c. the at least one pivoting member assembles the at least one tab to the receptacle back wall.

3. The electrical box of claim 1 wherein:
   a. the receptacle has back, top, side, and bottom walls;
   b. the walls define a first slot at the intersection of the back wall and the top wall, and a second slot at the intersection of the back wall and the bottom wall;
   c. said at least one tab comprises first and second tabs proximate the first and second slots, respectively; and
   d. the at least one pivoting member comprises first and second pivoting members that each assemble a respective first and second tab to the receptacle back wall,
   so that turning the first and second pivoting members pivots the first and second tabs, respectively, through the receptacle first and second slots.

4. The electrical box of claim 2 wherein the at least one slot is shorter than the length of the intersection between the receptacle back wall and the selected one of the top, bottom, and side walls.

5. The electrical box of claim 1 wherein the at least one pivoting member comprises:
   a. a screw having a head proximate the first surface of the at least one tab;
   b. a first nut proximate the second surface of the at least one tab and cooperating with the screw head to firmly grip the at least one tab therebetween; and
   c. a second nut located on the outside of the receptacle walls and cooperating with the screw to produce a drag on the at least one tab when it is pivoted in response to turning the screw head.

6. The electrical box of claim 1 wherein the at least one pivoting member and the at least one tab cooperate to produce a friction torque on the at least one tab in response to turning the at least one pivoting member.

7. The electrical box of claim 1 wherein the at least one pivoting member and the at least one tab cooperate to produce a positive torque on the at least one tab in response to turning the at least one pivoting member.

8. The electrical box of claim 1 wherein:
   a. the at least one pivoting member comprises a screw having a longitudinal axis and a peripheral surface that is non-circular about the longitudinal axis; and
   b. the at least one tab defines a hole therethrough that receives and matches the screw peripheral surface,
   so that the screw peripheral surface produces a positive torque on the at least one tab in response to turning the screw.

9. The electrical box of claim 1 wherein the at least one tab defines a convex leading edge that emerges first from the receptacle in response to turning the at least one pivoting member.

10. Apparatus that aids electrical wiring comprising:
   a. a receptacle having a plurality of walls that define an interior and an exterior of the receptacle and having at least one slot therethrough;
   b. at least one tab including a leading edge adapted to cut and embed into a wall surface, the tab being movable between a storage position whereat the leading edge is substantially within the interior of the receptacle and a working position whereat the leading edge projects through the at least one slot and is substantially outside the receptacle walls; and
   c. means for assembling the at least one tab to pivot through the at least one slot in the receptacle.

11. The apparatus of claim 10 wherein:
   a. the receptacle comprises first and second walls that intersect at a first intersection, and a third wall that intersects the first wall at a second intersection;
   b. the receptacle defines a first slot at the first intersection, and a second slot at the second intersection;
   c. first and second tabs are proximate the first and second slots, respectively; and
   d. the means for assembling comprises first and second means for assembling the first and second tabs to the receptacle first wall for pivoting through the first and second slots, respectively.

12. The apparatus of claim 10 wherein the means for assembling the at least one tab comprises means for producing a friction torque on the at least one tab.

13. The apparatus of claim 11 wherein each of the first and second means for assembling comprises:
   a. a screw having a head and passing through the associated tab and through the receptacle first wall; and
   b. a first nut on the screw and cooperating therewith to tightly grip the associated tab, so that turning the screw produces a friction torque on the associated tab and causes it to pivot.

14. The apparatus of claim 10 wherein the means for assembling the at least one tab further comprises means for producing a drag on the at least one tab.

15. The apparatus of claim 10 wherein the means for assembling the at least one tab comprises means for producing a positive torque on the at least one tab.

16. The apparatus of claim 11 wherein:
   a. each tab has a hole therethrough with a selected non-circular shape; and
   b. each first and second means for assembling comprises:
      i. a screw defining a longitudinal axis and having a section with a peripheral surface that matches and is received in the non-circular hole in the associated tab; and
      ii. means for cooperating with the screw to assemble the associated tab to the receptacle first wall,
   so that turning the screw produces a positive torque on the associated tab.

17. The apparatus of claim 16 wherein the means for cooperating with the screw comprises means for producing a drag on the associated tab in response to turning the screw.

18. In combination:
   a. an insulated foam wall panel that defines a recess having bottom and side surfaces; and
   b. an electrical box in the wall panel recess and comprising:
      i. a receptacle inserted into the wall panel recess, the receptacle having a plurality of walls that define an interior and an exterior of the receptacle and including a tab having a leading edge adapted to cut and embed into the foam wall panel; and
      iii. means for cooperating with the receptacle and the wall panel to move the tab from a storage position whereat the leading edge is substantially within the interior of the receptacle to permit placement of the receptacle into the wall panel recess and a working position in which the tab is substantially outside the receptacle walls to cuts and embed the tab into the foam panel wall to removeably anchor the box in the wall panel recess.

19. The combination of claim 18 wherein:
   a. the receptacle comprises a first wall proximate the wall panel bottom surface, and a plurality of second walls spaced from corresponding side surfaces of the wall panel recess and intersecting the receptacle first wall at respective intersections, the receptacle defining a slot proximate a selected intersection; and
   b. the means for cooperating with the receptacle comprises means for pivoting the tab between the storage position whereat the tab is substantially inside the receptacle walls, and the working position whereat the tab projects through the receptacle slot and is substantially outside of the receptacle walls.

20. The combination of claim 19 wherein the means for pivoting the tab comprises:
   a. a screw passing through a hole in the tab, and through a second hole in the receptacle first wall; and
   b. means for cooperating with the screw to tightly grip the tab to the screw,
   so that turning the screw produces a torque on the tab and thereby pivots the tab with the screw.

21. The combination of claim 19 further comprising means for producing a drag on the tab when the tab is pivoted between the storage and working positions.

22. The combination of claim 19 wherein the means for pivoting 15 the tab comprises means for producing a friction torque on the tab.

23. The combination of claim 19 wherein the means for pivoting the tab comprises means for producing a positive torque on the tab.

24. The combination of claim 19 wherein:
   a. the tab defines a first hole therethrough having a selected non-circular shape; and
   b. the means for pivoting the tab comprises a screw passing through the hole in the tab and through a second hole in the receptacle first wall, the screw having a peripheral surface that is received in and matches the shape of the hole in the tab and that cooperates therewith to produce a positive torque on the tab in response to turning the screw.

25. The combination of claim 24 further comprising means for producing a drag on the tab in response to turning the screw.

26. The combination of claim 19 wherein the tab has a convex leading edge that passes through the receptacle slot and embeds in the wall panel in response to pivoting the tab from the storage position to the working position.

27. A method of anchoring an electrical box in an insulated foam building wall panel comprising the steps of:
   a. cutting a recess in an insulated foam wall panel;
   b. inserting an electrical box receptacle in the wall panel recess;

c. pivoting a tab from a storage position substantially inside the receptacle toward a working position substantially outside of the receptacle in which the tab cuts into and embeds in the foam wall panel; and
d. embedding the tab in the wall panel.

28. The method of claim 27 wherein:
a. the step of inserting an electrical box receptacle comprises the step of providing a receptacle having a slot therein; and
b. the step of pivoting a tab comprises the steps of:
  i. assembling the tab to the receptacle proximate the slot; and
  ii. pivoting the tab through the slot from the storage position to the working position.

29. The method of claim 28 wherein:
a. the step of providing a receptacle comprises the step of providing the receptacle with a receptacle hole therethrough; and
b. the step of assembling the tab comprises the steps of:
  i. passing a screw through a hole in the tab and through the receptacle hole; and
  ii. assembling the screw to the receptacle.

30. The method of claim 29 wherein the step of pivoting the tab comprises the step of turning the screw.

31. The method of claim 30 comprising the further step of producing a drag on the tab in response to turning the screw.

32. The method of claim 30 comprising the further step of producing a friction torque on the tab in response to turning the screw.

33. The method of claim 30 comprising the further step of producing a positive torque on the tab in response to turning the screw.

\* \* \* \* \*

UNITED STATES PATENT AND TRADEMARK OFFICE
CERTIFICATE OF CORRECTION

PATENT NO. : 6,932,628 B1 Page 1 of 1
APPLICATION NO. : 10/830931
DATED : August 23, 2005
INVENTOR(S) : Brad L. Staedt It is certified that error appears in the above-identified patent and that said Letters Patent is hereby corrected as shown below:

Column 6, line 2, after "receptacle" delete "wail" and substitute -- wall --

Column 8, line 35, after "pivoting" delete "15"

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 6,932,628 B1 Page 1 of 1
APPLICATION NO. : 10/830931
DATED : August 23, 2005
INVENTOR(S) : Brad L. Staedt It is certified that error appears in the above-identified patent and that said Letters Patent is hereby corrected as shown below:

Column 6, line 2, after "receptacle" delete "wail" and substitute -- wall --

Column 8, line 35, after "pivoting" delete "15"

Signed and Sealed this

First Day of January, 2008

JON W. DUDAS
*Director of the United States Patent and Trademark Office*